Dec. 4, 1956 G. A. LYON 2,772,470
METALLIC CARTRIDGE CASINGS
Filed Dec. 17, 1951 2 Sheets-Sheet 1

Inventor
GEORGE ALBERT LYON
by [signature] Attys.

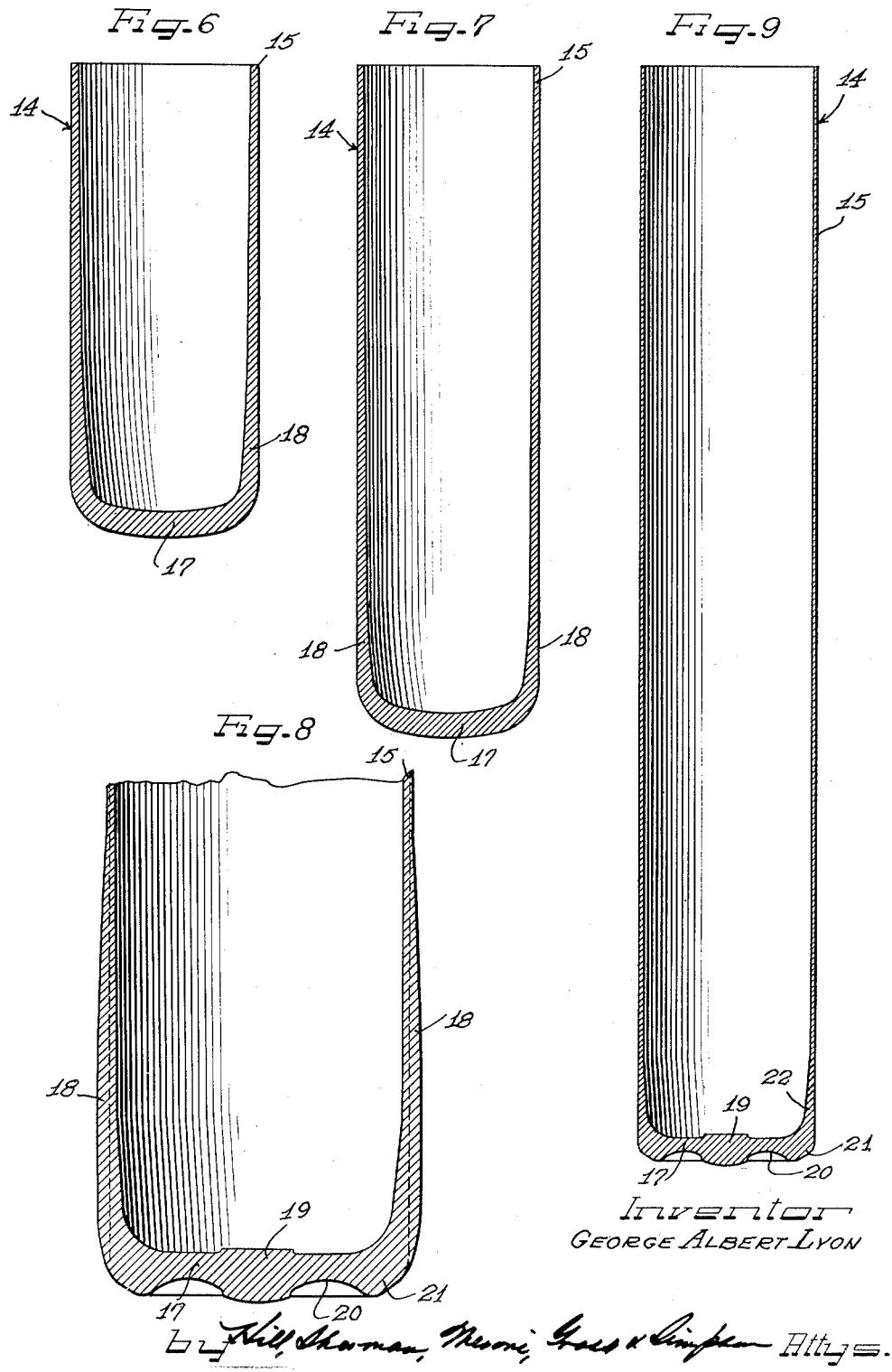

United States Patent Office 2,772,470
Patented Dec. 4, 1956

2,772,470

METALLIC CARTRIDGE CASINGS

George Albert Lyon, Detroit, Mich.

Application December 17, 1951, Serial No. 262,060

3 Claims. (Cl. 29—1.3)

The present invention relates to a method of manufacturing cartridge casings and more particularly to an improved method of coining and drawing a metallic casing from a blank of metal cut from a slab.

In the manufacture of cartridge shell casings such, for example, as are used in anti-aircraft and anti-tank shells, it is quite desirable to have the metal in the cylindrical wall of the casing hardened immediately adjacent the base without hardening of the base.

In the making of steel shell casings, it is also important, for reasons of economy, to reduce to a minimum the steps in the manufacturing process and also the time intervals in the heat treatments of the blank. For example, it has heretofore been considered important to spheroidize the blank to prepare it for drawing and subsequent machining. Spheroidizing is, however, a time-consuming step, and if it can be eliminated greatly reduces production time.

An important object of the present invention is to provide an improved method of making shell casings according to which not only the number of manipulative steps involved in the method, but also the heat treating steps are substantially reduced.

Another object of the invention is to provide an improved method of making steel shell casings and avoiding the step of spheroidizing the steel blank from which the casing is drawn.

A further object of the invention is to provide an improved method of making cartridge shell casings including a novel combining of coining and drawing steps in the base portions of the casing.

According to the general features of the present invention, there is provided in a method of drawing a metallic cartridge casing from a blank, the steps of coining a flat blank to provide a central thickened cup formation and a thinner margin, trimming the margin to circular form concentric with the cup, drawing said margin into elongated tubular form and with said cup at the base of the resulting casing, simultaneously coining the base of the partially drawn casing to provide a central button and a thickened marginal juncture with the wall of the casing and bulging the contiguous wall of the casing uniformly outwardly, and further drawing the wall of the casing including the bulged portion of the wall contiguous the base.

According to other general features of the invention there is provided a method of drawing a shell casing from a flat steel blank directly as cut from a steel slab, comprising initially coining the blank to cut the center of the blank and provide a thinner margin about the cup, drawing the flange into a casing wall, simultaneously coining the base of the casing and bulging outwardly the contiguous portion of the wall, and cold working the bulged portion of the wall longitudinally while maintaining the inner diameter of the wall constant, to elongate the casing wall substantially by displacement of the material of the bulged wall portion into cylindrical form throughout the length of the wall.

Other objects, features and advantages of the present invention will be readily apparent from the following detailed description of a preferred embodiment thereof taken in conjunction with the accompanying drawings, in which:

Figures 6 and 7 are vertical sectional views through the casing showing progressive cylindrical draws subsequent to the cup of Fig. 5;

Figure 8 is an enlarged fragmentary vertical sectional view through the lower portion of the casing at the stage shown in Fig. 7 but showing how the lower portion of the casing wall contiguous the base is bulged radially outwardly; and Figure 9 is a vertical sectional view through the casing following the cold work drawing of the bulged portion into cylindrical outside diameter.

A full understanding of the novel method of the present invention will be obtained from the following description related to the accompanying drawings.

Figure 1:
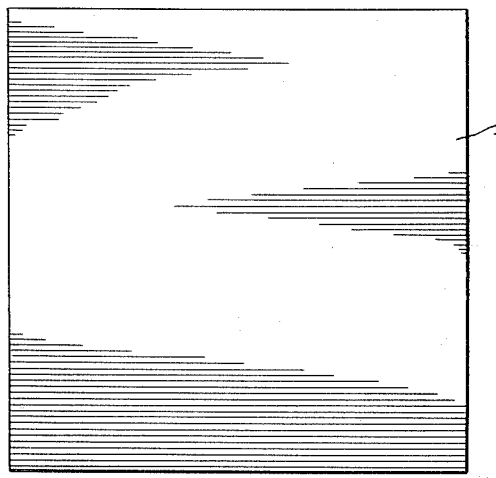
Figure 1 is a plan view of a polygonal or square shaped metallic blank.
Figure 2:
Figure 2 is an end or edge view of the blank shown in Fig. 1.

A polygonal blank 10 (Figs. 1 and 2) is cut from a slab of metal of suitable thickness. The blank as shown is of square form, although it may be in other desirable polygonal shapes if preferred.

Although the blank 10 may be brass, the method of the present invention is especially suitable for fabrication of casings for low carbon steel.

Figure 3:
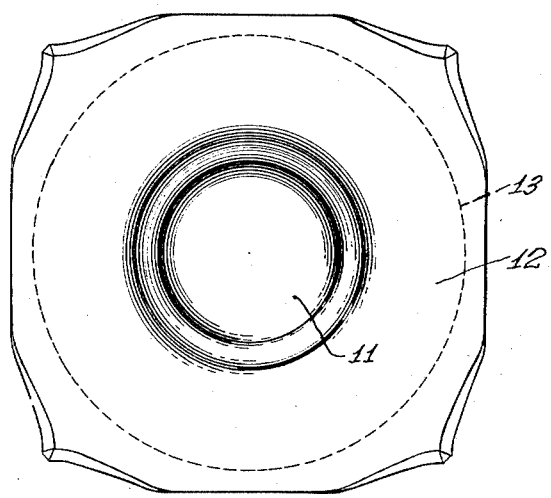
Figure 3 is a plan view of the blank after the initial coining of the blank.
Figure 4:
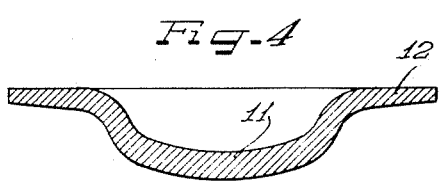
Figure 4 is a diametrical sectional view through the coined blank after trimming.

By initially cupping the blank 10 as shown in Fig. 3 to provide a centrally depressed cup 11 defined by a lateral margin 12, no special treatment of the blank is necessary to initiate the fabrication. Heretofore spheroidizing of the blank has been necessary in order to condition it for such initial operations as shaping it into a centrally thickened button, or the like. The present method eliminates this and the blank is directly cupped and the marign defining the central cup depression 11 is coined uniformly to a reduced tapering shape as best seen in Fig. 4. Inasmuch as the extreme edge portions of the coined blank are now irregular as seen in Fig. 3, and for subsequent drawing the blank should be in circular form, the extremity portions of the initially coined blank are trimmed circularly concentric with the cup 11 on a line 13. This leaves a circular coined, cup disk as seen in Fig. 4 with the uniform margin 12 tapered toward its edge.

Figure 5:
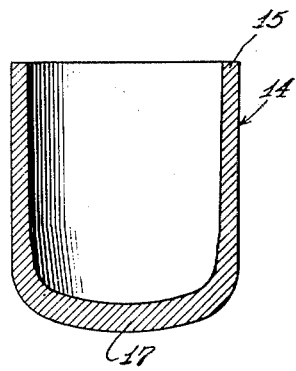
Figure 5 is a diametrical vertical sectional view through the blank after it has been subjected to a subsequent cupping operation to start the casing form.

The second fabricating step comprises drawing the cupped blank into the preliminary externally cylindrically walled short cup 14 as seen in Fig. 5 having a fairly thick tubular wall 15 cylindrical on the outside and tapering toward a thickened concave convex bottom or base wall 17.

Following the initial cupping and drawing operations, the casing is subjected progressively to additional drawing operations to gradually reduce the thickness of the wall 15, as shown in Figs. 6 and 7. In these successive draws, the external diameter of the wall remains cylindrical while at the inside the wall tapers toward the bottom 17, running to a substantially thickened tapering section 18 adjacent and marging with the thickened base or bottom wall 17.

When the partially drawn casing has reached the condition shown in Fig. 7, it is subjected to a very important further working before further drawing. This further working is represented in Fig. 8 and comprises bulging the lower thickened wall portion 18 uniformly radially outwardly and effecting a preliminary heading by coining the thicker bottom wall 17 looking toward final shaping and machining of the casing head. For this purpose, appropriate die mechanism is utilized including a punch and anvil die structure (not shown) appropriately shaped for the purpose. The punch will have the shape of the inside of the casing as seen in Fig. 8, while the anvil die member will have the shape of the bottom of the base wall 17 as shown in Fig. 8. As a result of this step in the method, the thickened lower portion 18 of the side wall of the casing is bulged out radially substantially beyond the cylindrical external diameter of the partially drawn casing, as shown in full outline in Fig. 8. Simultaneously, of course, the inner diameter of the casing side wall is expanded. At the same time the bottom wall 17 is flattened and is provided with a central embossment or button-like thickening 19 preferably projecting both upwardly and downwardly derived by displacing metal from an annular intermediate area 20 into the central button. Simultaneously part of the material is displaced from the annular lower face area 20 into an annular outer marginal downwardly projecting rib 21 substantially at the outer side of the juncture of the thickened wall portion 18 and the bottom or base wall 17.

Ultimately the central embossment 19 affords material to provide the customary internal, axially apertured and tapped primer boss for the finished shell casing. The annular outer marginal rib provides material which ultimately will provide the base flange with which shell casings are customarily provided.

Following the lateral spreading of the thickened bottom portion 18 of the side wall and the coining of the base wall 17, drawing of the shell casing 14 is completed by displacing the radially outwardly bulged material of the thickened lower portion 18 of the side wall of the casing longitudinally away from the bottom wall 17 to provide material for elongation of the side wall 15. During this displacement of the lower wall portion material and elongation of the side wall, the side wall is reduced in thickness uniformly above a lower internal fillet 22 at juncture with the internally flattened bottom wall 17 (Fig. 9) and the external diameter of the side wall from top to bottom is brought to cylindrical form (dash outline, Fig. 8) while the internal diameter of the side wall above the fillet 22 is also brought into substantially cylindrical form.

Displacement of the thickened bulging portion 18 is effected by cold working, thereby to cold-work harden the casing wall immediately above the base 17 and in the vicinity of the fillet 22 without substantially affecting the hardness of the base itself. Thereby the lower portion of the side wall is provided with at least a substantial degree of the hardness desirable for withstanding explosive forces within the shell in use, while the base 17 remains in a soft enough condition to enable ready and efficient machining thereof into the final, serviceable shape and structure.

It will be understood, of course, that the casing may be subjected to the customary annealing and pickling throughout the different steps or stages of the process for properly conditioning the metal for proper working in the stretching, coining and displacement thereof until the article is completed.

The method described herein is especially suitable for making steel shell casings economically and in high speed mass production. Not only the heat treatment but the actual manipulative steps involved in the production of the casings are minimized while nevertheless an improved shell casing results from the method.

It will be understood that modifications and variations may be effected without departing from the scope of the novel concepts of the present invention.

I claim as my invention:

1. In a method of drawing a metallic cartridge casing from a blank, the steps of coining or flat blank to provide a central thickened cup formation and a thinner margin, trimming the margin to circular form concentric with the cup, drawing said margin into elongated tubular form and with said cup at the base of the resulting casing, simultaneously coining the base of the partially drawn casing to flow metal in the base from an annular area thereof radially inwardly to provide a thickened central button and radially outwardly to provide a thickened marginal juncture with the wall of the casing and an intermediate annular thinned portion and bulging the contiguous wall of the casing uniformly outwardly, the further drawing the wall of the casing including the bulged portion of the wall contiguous the base.

2. A method of making cartridge shell casings which comprises shaping a metal blank into a partially formed casing comprising an elongated tubular side wall and a thickened concave convex bottom wall of substantially uniform inner and outer curvate faces, and coining the bottom wall into substantially flattened condition and forming a thickened central button bulge and an annular outer marginal downwardly projecting thickened bottom rib by displacing material from an annular intermediate bottom face area partially inwardly to form the central bulge and partially outwardly to form the rib.

3. The method of making a cartridge shell case which comprises shaping a metal blank into a tubular side wall and a thickened base wall, with the lower portion of the side wall substantially thicker than the upper portion and tapering toward the base wall, bulging said thickened bottom portion of the side wall radially outwardly, coining the material between the center and periphery of the base wall partially radially inwardly and partially radially outwardly into a thickened central embossment and a thickened marginal rib, and thereafter cold working the bulged material of the lower portion of the side wall into elongation of the upper portion of the side wall.

References Cited in the file of this patent

UNITED STATES PATENTS

| | | |
|---|---|---|
| 346,759 | Lorenz | Aug. 3, 1886 |
| 457,767 | Bradley | Aug. 18, 1891 |
| 756,404 | Polte | Apr. 5, 1904 |
| 2,301,565 | Moore | Nov. 10, 1942 |
| 2,360,353 | Lyon | Oct. 17, 1944 |
| 2,360,354 | Lyon | Oct. 17, 1944 |

FOREIGN PATENTS

| | | |
|---|---|---|
| 553 | Great Britain | Feb. 4, 1882 |
| 10,683 | Great Britain | July 28, 1884 |
| 561,448 | Great Britain | May 19, 1944 |